United States Patent [19]

Ueyama et al.

[11] 4,187,012

[45] Feb. 5, 1980

[54] METHOD AND APPARATUS FOR EXPOSURE OF PHOSPHOR SCREEN

[75] Inventors: Takehiko Ueyama; Masahiro Nishizawa, both of Mobara; Eiichi Yamazaki, Ichihara; Iwao Ogura, Tokyo, all of Japan

[73] Assignee: Hitachi, Ltd., Tokyo, Japan

[21] Appl. No.: 869,665

[22] Filed: Jan. 16, 1978

[30] Foreign Application Priority Data

Mar. 2, 1977 [JP] Japan ................................ 52/21517

[51] Int. Cl.$^2$ ........................................ G03B 41/00

[52] U.S. Cl. ........................................ 354/1

[58] Field of Search ................ 354/1; 96/36.1; 427/68

[56] References Cited

U.S. PATENT DOCUMENTS

| | | | |
|---|---|---|---|
| 3,828,358 | 8/1974 | Miyaoka | 354/1 |
| 4,070,498 | 1/1978 | Nishizawa et al. | 96/36.1 X |

*Primary Examiner*—John Gonzales

*Attorney, Agent, or Firm*—Craig and Antonelli

[57] ABSTRACT

An exposure method and apparatus for forming phosphor stripes or black matrix stripes on the inner surface of a face plate of a stripe phosphor screen type color picture tube or CRT (cathode-ray tube), in which a single linear light source is used as the exposure light source, and a prism device including many juxtaposed prisms is disposed between the linear light source and the face plate. The taper angle of the prisms is continuously changed so that the single linear light source can be observed as a plurality of discontinuous virtual linear light sources at whatever point on the inner surface of the face plate, and the virtual linear light sources have a most suitable center-to-center distance at individual positions on the face plate. The above arrangement eliminates the necessity for drive means for moving the linear light source, and a phosphor screen having three color phosphor stripes of satisfactorily uniform width can be formed on the entire inner surface of the face plate with use of the single linear light source.

14 Claims, 12 Drawing Figures

METHOD AND APPARATUS FOR EXPOSURE OF PHOSPHOR SCREEN

LIST OF PRIOR ART REFERENCES (37 CFR 1.56(a))

The following references are cited to show the state of the art:

1. Japanese Patent Publication No. 30991/75
2. Japanese Patent Publication No. 29635/76
3. Japanese Patent Laid-Open No. 136280/76

This invention relates to the art of exposure of the phosphor screen of a color picture tube or CRT (cathode-ray tube) of the stripe phosphor screen type, and more particularly to an exposure method and apparatus for forming phosphor stripes, having a width narrower than the slot width of the shadow mask, on the inner surface of the face plate of a color picture tube of the type above described.

In a color picture tube of the stripe type, phosphor stripes having a width narrower than the slot width of the shadow mask are generally formed on the inner surface of the face plate in order to increase the landing allowance of the electron beams. As a means for forming such phosphor stripes of narrow width, a method is commonly known in which two linear light sources are used, and the exposure profiles of the individual light sources are arranged to overlap each other during exposure. In such a known method, an extra high pressure mercury lamp is frequently used as each individual light source. This known method has however been defective in that the effective distance between the light sources is limited due to the bulb outer diameter of the mercury lamps and also due to the requirement for provision of cooling means, resulting in impossibility of providing the practically most suitable center-to-center distance of 1 to 3 mm.

Another method which obviates such a defect is also commonly known in which a single linear light source is sequentially moved for alternate exposure between two positions. This method has also been defective in that a light source moving mechanism of complex structure is required, and the impossibility of simultaneous exposure reduces the effect of a photoresist material of reciprocity law failure type.

In an effort to obviate such prior art defects, the inventors have previously proposed a method of exposure in which a prism device is combined with a single linear light source so that two virtual linear light sources can be observed when viewed from the side of the face plate. This proposed method has however been completely unsatisfactory since only one of the two virtual linear light sources is visible when observed from some points at the side of the face plate.

It is therefore a primary object of the present invention to provide a novel and improved method of exposing the face plate to light directed from a single linear light source so that two virtual light sources can be always observed in the entire area of the face plate and also to provide an apparatus preferably used for the practice of such a method.

The above-mentioned and other features and objects of this invention will become more apparent by reference to the following description taken in conjunction with the accompanying drawings, in which.

Figure 2:
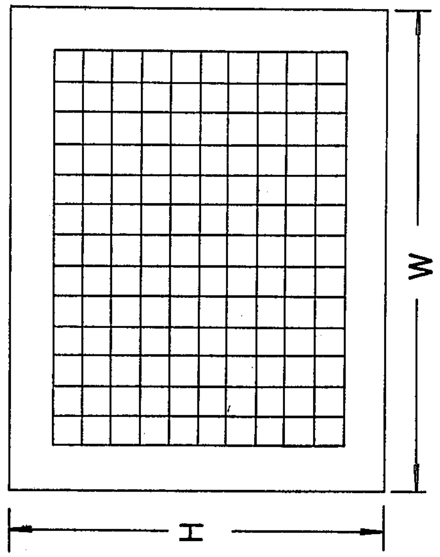
FIG. 2 is a schematic front elevational view of one form of a prism device employed in an embodiment of the method according to the present invention.
Figure 3A:
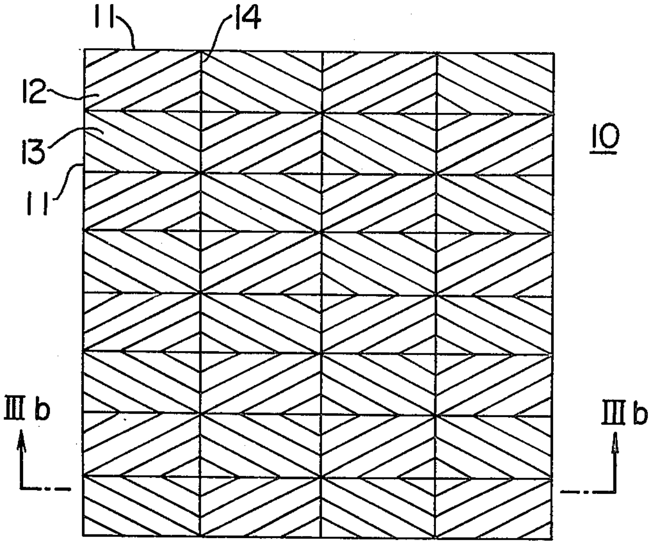
Figure 3B:
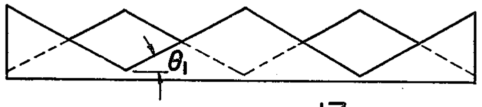

FIG. 3*a* is a schematic front elevational view of prisms arranged in individual sections of the prism device shown in FIG. 2 for producing two virtual linear light sources;

FIG. 3*b* is a schematic sectional view taken along the line III*b*–III*b* in FIG. 3*a;*

Figure 4:
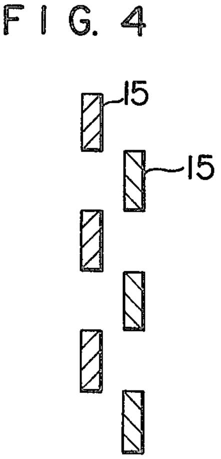

FIG. 4 illustrates the two virtual linear light sources produced in discontinuous fashion by the prisms shown in FIG. 3*a;*

Figure 5:
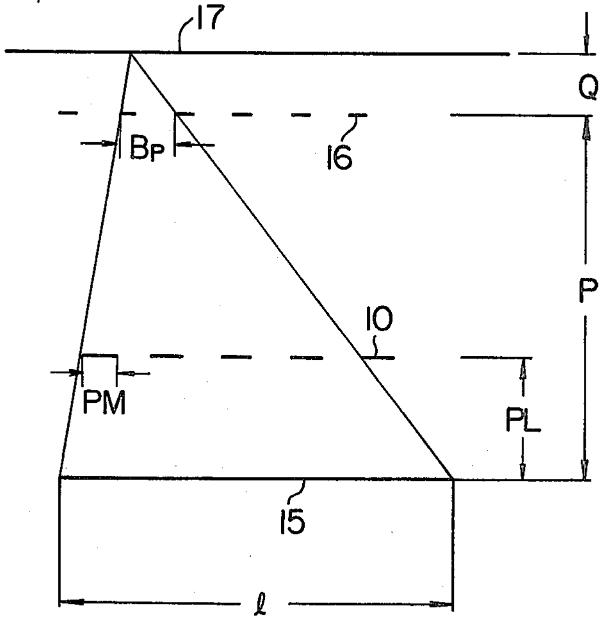
Figure 6A:
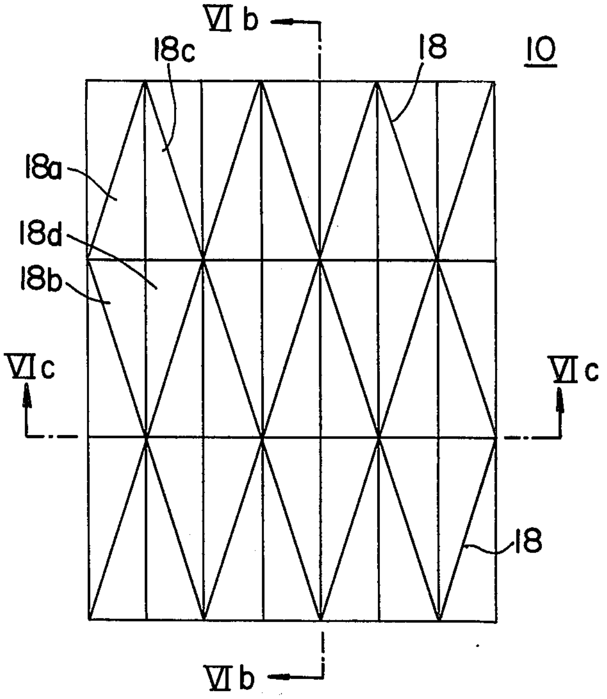
Figure 6B:
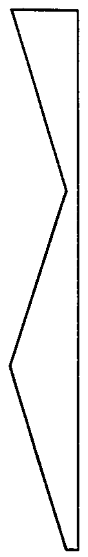
Figure 7:
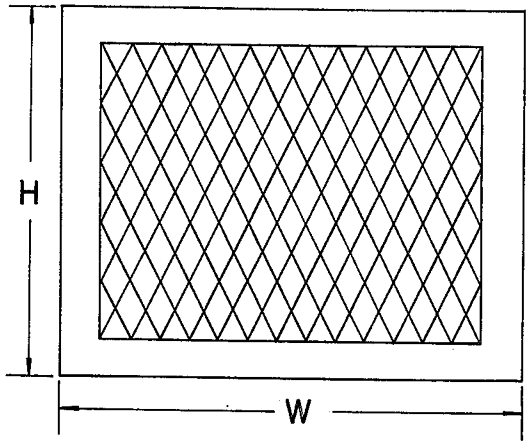

FIG. 5 is a diagrammatic view illustrating the most suitable length of the linear light source;

FIG. 6*a* is a schematic front elevational view of prisms arranged in individual sections of the prism device shown in FIG. 7;

FIG. 6*b* is a schematic sectional view taken along the line VI*b*–VI*b* in FIG. 6*a;*

Figure 6C:
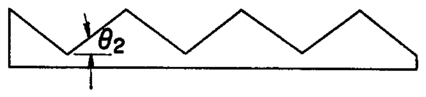

FIG. 6*c* is a schematic sectional view taken along the line VI*c*–VI*c* in FIG. 6*a;*

Figure 8:
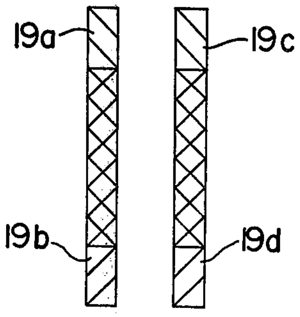
Figure 9:
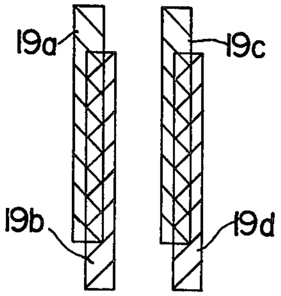

FIG. 7 is a schematic front elevational view of another form of a prism device employed in another embodiment of the method according to the present invention;

FIG. 8 illustrates the two virtual linear light sources produced in discontinuous fashion by the prisms shown in FIG. 6*a;* and FIG. 9 illustrates the four virtual linear light sources produced in discontinuous fashion by slightly inclining the entire prism device relative to the axis of the single linear light source.

For a better understanding of the present invention, the exposure path according to the prior art method using a prism will be described with reference to FIG. 1 before describing the present invention in detail.

Figure 1:
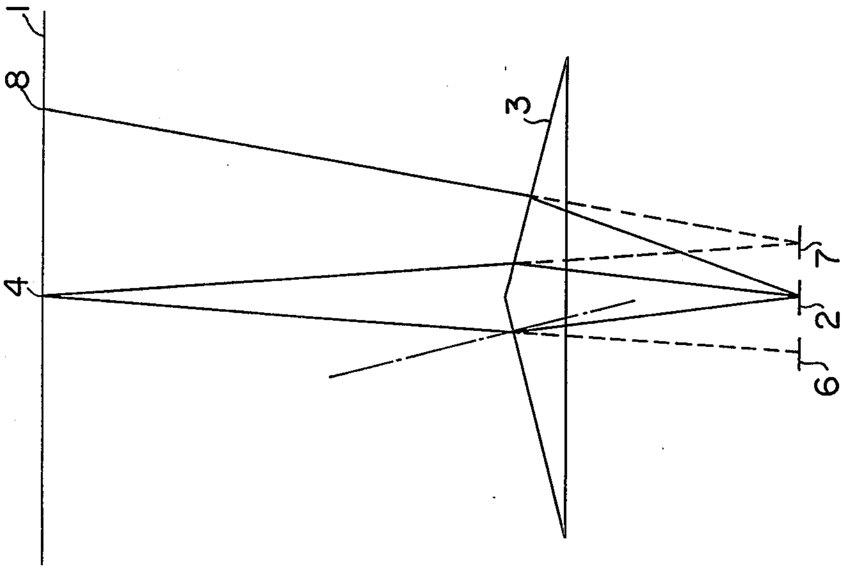
FIG. 1 PRIOR ART
FIG. 1 is a diagrammatic view illustrating the exposure path according to a prior art method using a prism device as described hereinbefore.

According to this prior art method, a prism 3 is disposed in the exposure path between a face plate 1 and a linear light source 2 as shown in FIG. 1. Thus, when the linear light source 2 is observed from a point 4 on the face plate 1, two virtual linear light sources 6 and 7 are observed due to the refraction of light by the prism 3, so that the single light source 2 is observed virtually as two separate light sources. This prior art method is however defective in that the virtual light source 7 only can be observed when the llight source 2 is viewed from another point on the face plate 1, such as a point shown by the numeral 8 in FIG. 1.

The present invention provides a novel and improved method and apparatus which obviate the above defect. An embodiment of the method according to the present invention will now be described in detail with reference to the drawings.

FIG. 2 is a schematic front elevational view of a prism device employed in the practice of the method according to the present invention. Although a linear light source is not shown in FIG. 2, this light source is located on the back side of the sheet surface to extend in a vertical direction in parallel with the sheet surface in FIG. 2. For instance, the prism device is divided into at least 130 small sections as seen in FIG. 2, each of which is provided with a plurality of prisms each having a taper plane inclined in a different direction at a same angle. Each individual section may be in the form of a square, a rectangle, a rhombic shape or the like, and the one side (H) and the other side (W) of the entire prism device are about 145 mm and about 185 mm respectively.

FIG. 3*a* is a front elevational view to show the shape of the prisms used in the method of the present invention so that a single linear light source can produce two virtual light sources. Oblique lines are shown in FIG. 3*a* to indicate that the prisms are tapered alternately in opposite directions. The portions 12 having the oblique lines sloping toward the left are tapered toward the left, and the portions 13 having the oblique lines sloping toward the right are tapered toward the right. In other words, when individual prism blocks constituting a prism assembly 10 are denoted by the reference numeral 11 in FIG. 3*a*, the tapered face 12 of one prism block 11 has a direction of inclination opposite to that of the tapered face 13 of the adjacent prism block 11, and these tapered faces 12 and 13 are tapered toward the left and right respectively on opposite sides of the ridgeline 14. Many of these prism blocks 11 are closely arranged side by side in such a relation that the direction of inclination of their tapered faces changes alternately in the lateral direction. Thus, the tapered faces 12 and 13 of the laterally adjacent prism blocks 11 are contiguous at their boundary, but those of the longitudinally adjacent prism blocks 11 are discontiguous or stepped at their boundary since the associated tapered faces have the different directions of inclination in the lateral direction.

In each of the 130 sections of the prism device shown in FIG. 2, a vertical pair of prism blocks 11 shown in FIG. 3*a* are disposed. Referring to FIG. 3*b* showing a cross-section taken along the line IIIb—IIIb in FIG. 3*a*, and then since the length of the light source is much longer as compared with that of each prism block disposed in one section, there are provided two virtual light sources which are observed through the prism face tapered toward the right and also observed through the prism face tapered toward the left, and are displaced in an opposite direction to each other respectively. Thus, when viewed from the side of the face plate, a single linear light source 15 directing light toward the face plate through the tapered prism face is observed virtually as two discontinuous linear light sources 15 as shown in FIG. 4. In general, the taper angle $\theta_1$ of the prisms in the same section of the prism device is the same. However, the prisms in all the sections ranging from the central area to the peripheral area of the prism device do not have the same taper angle, and the taper angle $\theta_1$ changes continuously at a slight rate. In the case of exposure of the face plate of, for example, a 22-inch 100°-deflection cathode-ray tube of the post-deflection focus type, it is said that the most suitable center-to-center distance between the virtual light sources when viewed from the central area of the face plate is about 1 mm, and that when viewed from the peripheral area (spaced apart by 250 mm from the center) of the face plate is about 2 mm. Thus, the prism device is disposed at a position spaced apart by 95 mm from the light source, and the prisms in a section in the central area of the prism device have a taper angle $\theta_1$ of about 0.009 radians, while those in a section spaced apart from the center of the prism device by 70 mm toward the right and 45 mm toward the top have a taper angle $\theta_1$ of about 0.005 radians.

In accordance with the present invention, even when exposure is effected with such two discontinuous virtual linear light sources the distribution of intensity of light on the face plate along a direction orthogonal to the axes of the discontinuous virtual linear light sources is approximately the same as when exposure is effected with two continuous virtual linear light sources.

The essential condition for forming continuous stripes of predetermined constant width is to maintain constant the distribution of intensity of light in the axial direction of the stripes.

This essential condition will be discussed with reference to FIG. 5. Suppose that l, P, Q and $B_P$ in FIG. 5 designate the length of the linear light source 15, the distance between the light source 15 and the shadow mask 16, the distance between the shadow mask 16 and the face plate 17, and the slot pitch of the shadow mask 16, respectively. Then, the length l of the linear light source 15 providing the constant distribution of intensity of light in the axial direction of the stripes is expressed as follows:

$$l=B_P\times(P+Q)/Q \quad (1)$$

Thus, in order that the single linear light source 15 can be observed as two virtual linear light sources, and the distribution of the intensity of light in the axial direction of the stripes can be made constant, the prism assembly 10 disposed between the light source 15 and the shadow mask 16 must satisfy the following equation:

$$PM\cdot 2n\cdot(P+Q)/(P+Q-PL)=l \quad (2)$$

where n is an integer, PM is the length of each prism block, and PL is the distance between the light source 15 and the prism assembly 10.

In the case where the equation (2) is satisfied, the light source will be observed as being two virtual linear light sources and consequently the light intensity distribution in a direction to the axis of the stripe will be kept constant. However, generally such a value of PM capable of satisfying the equation (2) does not exist, but the light intensity distribution may be improved by vibrating the entire prism device in a direction to the axis of the stripe. By the use of the prism assembly 10 satisfying the equation (2), exposure by the two virtual linear light sources can be satisfactorily effected, and the continuous stripes having the width narrower than the slot width of the shadow mask can be formed.

In FIGS. 3*a* and 3*b*, the prism assembly 10 is shown composed of prism blocks 11 which have rectangular prism faces of alternately changing taper. However, the present invention is in no way limited to the specific prism configuration shown in FIGS. 3*a* and 3*b*. For example, each of the prisms constituting the prism assembly 10 may be in the form of a pyramid 18 having a rhombic bottom face as shown in FIG. 6*a*, and one of the diagonals of the rhombus may be disposed in parallel with the axis of the single linear light source. In that case, the whole structure of the prism device is that as shown in FIG. 7, and the light source may be observed as being the respective virtual light sources 19*a*, 19*b*, 19*c*, and 19*d* as shown in FIG. 8 with respect to the respective planes 18*a*, 18*b*, 18*c* and 18*d* of the pyramid 18, but the respective virtual light sources 19*a* and 19*b* are superposed by the respective virtual light sources, so that the virtual light sources may be observed as being two light sources. Further, this diagonal of the rhombus may be slightly inclined relative to the axis of the single linear light source, so that as shown in FIG. 9 this single light source may be observed as four virtual linear light sources.

The taper of the prism is suitably selected depending on the position of the prism assembly 10 in the exposure system so as to provide the center-to-center distance of 1.0 to 3.0 mm between the two virtual linear light sources. When the prism assembly 10 is arranged to provide four virtual linear light sources, the center-to-center distances of the adjacent virtual light sources may be selected to be 0.2 to 0.8 mm, 1.0 to 2.5 mm and 0.2 to 0.8 mm respectively. The taper angle of these prisms changes continuously from a section in the central area toward a section in the peripheral area of the prism device, as in the case of FIGS. *3a* and *3b*.

Referring to FIGS. *6b* and *6c* showing sections taken along the lines VIb—VIb and VIc—VIc in FIG. *6a* respectively, the taper angle of the prisms in a section in the central area of the prism device is, for example, about 0.007 radians, and that in a section spaced from the center of the prism device by 70 mm toward the right and 45 mm toward the top is, for example, about 0.004 radians.

It will be understood from the foregoing detailed description of the present invention that a single linear light source can act as a plurality of virtual linear light sources during exposure in the entire area of the face plate, and the center-to-center distance between these virtual linear light sources can be selected to be most suitable for the exposure purpose. Further, the present invention eliminates the prior art necessity for light source moving means.

What is claimed is:

1. A method of exposure for forming a phosphor screen on an inner surface of a faceplate of a color picture tube, comprising the steps of:

disposing a single linear real light source at a position spaced apart by a predetermined distance from the inner surface of the faceplate of the color picture tube so that the axis of said linear real light source is parallel to the inner surface of said faceplate;

disposing a prism device between said linear real light source and the inner surface of said faceplate, said prism device comprising a plurality of prisms each including a base surface substantially in parallel with the inner surface of said faceplate and at least two light-refracting surfaces disposed at a predetermined angle with respect to said base surface, said prisms being juxtaposed such that the light-refracting surfaces of adjacent ones of said prisms in the direction of the length of said linear real light source cross each other; and directing light from said linear real light source toward said faceplate through said prism device, whereby said single linear real light source may be observed as a plurality of virtural linear light sources from every point on said faceplate.

2. A method as claimed in claim 1, wherein said angle changes depending on a distance from the center of said prism device to the location of said each prism and according to a predetermined function of said distance.

3. A method as claimed in claim 2, wherein said light-refracting surfaces are rectangular in shape.

4. A method as claimed in claim 2, wherein each of said prisms is in the form of a pyramid and said base surface has the shape of a rhombus.

5. A method as claimed in claim 4, wherein one of the diagonals of said rhombus extends in parallel with the axis of said linear real light source.

6. A method as claimed in claim 4, wherein one of the diagonals of said rhombus is slightly inclined relative to the axis of said linear real light source so that said single linear real light source is observed as four virtual linear light sources at any point on said faceplate.

7. A method as claimed in claim 3, wherein the number of said virtual light source is two and the center-to-center distance of said two virtual light sources is 1.0 to 3.0 mm.

8. A method as claimed in claim 6, wherein the center-to-center distances of said four adjacent virtual light sources are 0.2 to 0.8 mm, 1.0 to 2.5 mm and 0.2 to 0.8 mm, respectively.

9. A method as claimed in claim 2, further comprising the step of oscillating said prism device in the direction of the length of said linear light source, to thereby make uniform distribution of intensity of light at any point on said faceplate.

10. Exposure apparatus for forming a phosphor screen on the inner surface of a face plate of a color picture tube, comprising a single real linear light source disposed at a position spaced apart by a predetermined distance from the inner face of the face plate of the color picture tube while extending in parallel therewith, and a prism device disposed between said linear light source and the inner surface of said face plate, said prism device including a plurality of prisms closely arranged so as to constitute a means for causing said single linear real light source to be observed as a plurality of virtual linear light sources from every point on said face plate, wherein said prisms are juxtaposed such that light-refracting surfaces of prisms, adjacent to each other in the direction of the length of said linear real light source, cross each other.

11. Exposure apparatus according to claim 10, wherein said refracting surfaces are rectangular in shape.

12. Exposure apparatus according to claim 10, wherein each of said prisms is a pyramid having a rhombus shaped base.

13. Exposure apparatus according to claim 12, wherein said rhombus shaped base has one diagonal that extends parallel to the length of said linear real light source.

14. Exposure apparatus according to claim 12, wherein said rhombus shaped base has one diagonal which is slightly inclined relative to the axis of said linear real light source so that said single linear real light source is observed as four virtual linear light sources at any point on said faceplate.

* * * * *